US012638472B2

(12) United States Patent
Chang et al.

(10) Patent No.: US 12,638,472 B2
(45) Date of Patent: May 26, 2026

(54) METHOD FOR OBTAINING THE EQUIVALENT OXIDE THICKNESS OF A DIELECTRIC LAYER

(71) Applicants: MSSCORPS CO., LTD., Hsinchu City (TW); NATIONAL CHUNG HSING UNIVERSITY, Taichung City (TW)

(72) Inventors: Mao-Nan Chang, Taichung City (TW); Chi-Lun Liu, Hsinchu City (TW); Hsueh-Liang Chou, Hsinchu City (TW); Yi-Shan Wu, Taichung City (TW); Chiao-Jung Lin, Hsinchu City (TW); Yu-Hsun Hsueh, New Taipei City (TW)

(73) Assignees: MSSCORPS CO., LTD., Hsinchu City (TW); National Chung Hsing University, Taichung City (TW)

( * ) Notice: Subject to any disclaimer, the term of this patent is extended or adjusted under 35 U.S.C. 154(b) by 545 days.

(21) Appl. No.: 18/299,986

(22) Filed: Apr. 13, 2023

(65) Prior Publication Data

US 2024/0133918 A1    Apr. 25, 2024
US 2024/0230710 A9    Jul. 11, 2024

(30) Foreign Application Priority Data

Oct. 20, 2022    (TW) ................................. 111139739

(51) Int. Cl.
 *G01Q 60/46*        (2010.01)
 *G01B 7/06*         (2006.01)
  (Continued)

(52) U.S. Cl.
 CPC ............. *G01Q 60/46* (2013.01); *G01B 7/085* (2013.01)

(58) Field of Classification Search
 CPC .... G01Q 60/46; G01B 7/085; G01B 2210/56; G01R 31/2639; G01R 31/2648; H01L 22/20
 See application file for complete search history.

(56) References Cited

PUBLICATIONS

Mao-Nan Chang, Yung-Kuang Chen, Hung-Yi Kao, Jhih-Yang Chen, Chun-Hsien Liu, Yao-Jen Lee. Voltage modulation efficiency in scanning capacitance microscopy. Ultramicroscopy. vol. 224. 2021. 113266. ISSN 0304-3991. (Year: 2021).*

(Continued)

*Primary Examiner* — David E Smith
*Assistant Examiner* — Laura Eloise Tandy
(74) *Attorney, Agent, or Firm* — Rosenberg, Klein & Lee

(57) ABSTRACT

In a method for obtaining the equivalent oxide thickness of a dielectric layer, a first semiconductor capacitor including a first silicon dioxide layer and a second semiconductor capacitor including a second silicon dioxide layer are provided and a modulation voltage is applied to the semiconductor capacitors to measure a first scanning capacitance microscopic signal and a second scanning capacitance microscopic signal. According to the equivalent oxide thicknesses of the silicon dioxide layers and the scanning capacitance microscopic signals, an impedance ratio is calculated. The modulation voltage is applied to a third semiconductor capacitor including a dielectric layer to measure a third scanning capacitance microscopic signal. Finally, the equivalent oxide thickness of the dielectric layer is obtained according to the equivalent oxide thickness of the first silicon dioxide layer, the first scanning capacitance microscopic signal, third scanning capacitance microscopic signal, and the impedance ratio.

9 Claims, 5 Drawing Sheets

(51) Int. Cl.
   *G01R 31/26*      (2020.01)
   *H10P 74/00*      (2026.01)

(56)             References Cited

PUBLICATIONS

K. K. S. Joseph, T. C. Lik and N. S. Huat, "Characterization of SOI Film Thickness, Oxide Thickness and Charges with C-V Measurement," 2018 IEEE International Conference on Semiconductor Electronics (ICSE), Kuala Lumpur, Malaysia, 2018, pp. 324-327 (Year: 2018).*

Abermann, Stephan, et al. "Nanoscopic versus macroscopic C-V characterization of high-κ metal-oxide chemical vapor deposition $ZrO_2$ thin films." Microelectronic engineering 83.4-9 (2006): 1055-1057.

Yanev, V., et al. "Characterization of thickness variations of thin dielectric layers at the nanoscale using scanning capacitance microscopy." Journal of Vacuum Science & Technology B 29.1 (2011).

Search Report mailed to Corresponding European Patent Application No. 23166361.8-1020 on Sep. 15, 2023.

* cited by examiner

METHOD FOR OBTAINING THE EQUIVALENT OXIDE THICKNESS OF A DIELECTRIC LAYER

This application claims priority for the TW patent application no. 111139739 filed on 20 Oct. 2022, the content of which is incorporated by reference in its entirely.

BACKGROUND OF THE INVENTION

Field of the Invention

The present invention relates to a method for obtaining a thickness, particularly to a method for obtaining the equivalent oxide thickness of a dielectric layer.

Description of the Related Art

Capacitance-voltage (C-V) measurements are widely used to measure the parameters of semiconductor devices, especially MOS capacitors and MOSFETs. University labs and semiconductor manufacturers use these measurements to evaluate new materials, components and circuits.

The MOS capacitor is a basic element in the semiconductor manufacturing process. The MOS capacitor includes a semiconductor substrate, a dielectric layer and a metal layer arranged from bottom to top. When the capacitance-voltage measurement is performed on the MOS capacitor, a DC voltage and an AC signal are applied to the MOS capacitor. The frequency of the AC signal ranges between 1 kHz and 1,000 kHz. The DC voltage drives the MOS capacitor to enter the accumulation region, the depletion region and the inversion region in sequence. The higher DC voltage causes majority carriers in the substrate to accumulate near the interface of the dielectric layer. Since the carriers cannot penetrate through the dielectric layer, the capacitance in the accumulation region reaches the maximum value as the charges continue accumulating near the interface. As the DC voltage decreases to be inverted, the majority carriers are repelled from the interface of the dielectric layer, thus forming a depletion region. When the inverted DC voltage continues decreasing, a distance between the carrier and the dielectric layer reaches the maximum value and the total capacitance reaches the minimum value. The equivalent oxide thickness (EOT) of the dielectric layer can be obtained by capacitance-voltage measurement. However, the capacitance-voltage measurement needs to use a DC voltage. If the DC voltage is applied to the dielectric layer and generates a leakage current, the analysis result of the equivalent oxide thickness will be inaccurate.

To overcome the abovementioned problems, the present invention provides a method for obtaining the equivalent oxide thickness of a dielectric layer, so as to solve the afore-mentioned problems of the prior art.

SUMMARY OF THE INVENTION

The present invention provides a method for obtaining the equivalent oxide thickness of a dielectric layer which evaluates the exact equivalent oxide thickness of the dielectric layer of a semiconductor capacitor without using a DC voltage to be affected by leakage current, and employs the scanning capacitance microscopy to measure the equivalent oxide thickness of the dielectric layer to expand the related applications of the scanning capacitance microscopy.

In an embodiment of the present invention, a method for obtaining the equivalent oxide thickness of a dielectric layer is provided. Firstly, a first semiconductor capacitor and a second semiconductor capacitor are provided. The first semiconductor capacitor includes a first silicon dioxide layer and a first depletion region. The second semiconductor capacitor includes a second silicon dioxide layer and a second depletion region. The first silicon dioxide layer and the second silicon dioxide layer have known equivalent oxide thicknesses. The first total impedance of the first semiconductor capacitor includes the first impedances of first regions and a first equivalent impedance corresponding to the first silicon dioxide layer. The second total impedance of the second semiconductor capacitor includes the second impedances of second regions and a second equivalent impedance corresponding to the second silicon dioxide layer. The first impedances are respectively equal to the second impedances. By the scanning capacitance microscopy, a modulation voltage is applied to the first semiconductor capacitor and the second semiconductor capacitor to periodically vary the widths of the first depletion region and the second depletion region and a first scanning capacitance microscopic signal and a second scanning capacitance microscopic signal respectively corresponding to the first semiconductor capacitor and the second semiconductor capacitor are measured. An impedance ratio is calculated according to the equivalent oxide thicknesses of the first silicon dioxide layer and the second silicon dioxide layer, the first scanning capacitance microscopic signal, and the second scanning capacitance microscopic signal. A third semiconductor capacitor is provided. The third semiconductor capacitor includes a dielectric layer and a third depletion region. The third total impedance of the third semiconductor capacitor includes the third impedances of third regions and a third equivalent impedance corresponding to the dielectric layer of the third semiconductor capacitor. The third impedances are respectively equal to the first impedances. By the scanning capacitance microscopy, the modulation voltage is applied to the third semiconductor capacitor to periodically vary the width of the third depletion region and a third scanning capacitance microscopic signal corresponding to the third semiconductor capacitor is measured. The equivalent oxide thickness of the dielectric layer of the third semiconductor capacitor is obtained according to the equivalent oxide thickness of the first silicon dioxide layer, the first scanning capacitance microscopic signal, the third scanning capacitance microscopic signal, and the impedance ratio.

In an embodiment of the present invention, each of the first semiconductor capacitor, the second semiconductor capacitor, and the third semiconductor capacitor is a metal-oxide-semiconductor capacitor.

In an embodiment of the present invention, each of the first semiconductor capacitor, the second semiconductor capacitor, and the third semiconductor capacitor further includes a conductive probe that is electrically grounded.

In an embodiment of the present invention, the equivalent oxide thicknesses of the first silicon dioxide layer and the second silicon dioxide layer are obtained by measuring the capacitance versus voltage characteristic curves of the first semiconductor capacitor and the second semiconductor capacitor at a control frequency equal to an alternating-current (AC) frequency of the modulation voltage.

In an embodiment of the present invention, the first semiconductor capacitor further includes a first electrode layer and a first semiconductor substrate. The first electrode layer and the first silicon dioxide layer are respectively formed on the bottom surface and the top surface of the first semiconductor substrate. The second semiconductor capacitor further includes a second electrode layer and a second semiconductor substrate. The second electrode layer and the second silicon dioxide layer are respectively formed on the bottom surface and the top surface of the second semiconductor substrate. The third semiconductor capacitor further includes a third electrode layer and a third semiconductor substrate. The third electrode layer and the dielectric layer are respectively formed on the bottom surface and the top surface of the third semiconductor substrate. The first impedances include the impedance of the first depletion region, the impedance of the first electrode layer, and the impedance of the first semiconductor substrate. The first equivalent impedance includes the impedance of an interface between the first silicon dioxide layer and the first semiconductor substrate and the impedance of the first silicon dioxide layer. The second impedances include the impedance of the second depletion region, the impedance of the second electrode layer, and the impedance of the second semiconductor substrate. The second equivalent impedance includes the impedance of an interface between the second silicon dioxide layer and the second semiconductor substrate and the impedance of the second silicon dioxide layer. The third impedances include the impedance of the third depletion region, the impedance of the third electrode layer, and the impedance of the third semiconductor substrate. The third equivalent impedance includes the impedance of an interface between the dielectric layer and the third semiconductor substrate and the impedance of the dielectric layer.

In an embodiment of the present invention, the equivalent oxide thicknesses of the first silicon dioxide layer and the second silicon dioxide layer, the first scanning capacitance microscopic signal, the second scanning capacitance microscopic signal, and the impedance ratio satisfy an equation of $S1/S2=1+(k-1)ZR$. S1 represents the first scanning capacitance microscopic signal, S2 represents the second scanning capacitance microscopic signal, k equals the equivalent oxide thickness of the second silicon dioxide layer divided by the equivalent oxide thickness of the first silicon dioxide layer, and ZR represents the impedance ratio.

In an embodiment of the present invention, the first scanning capacitance microscopic signal, the third scanning capacitance microscopic signal, the equivalent oxide thickness of the first silicon dioxide layer, and the impedance ratio satisfy an equation of $S1/S3=1+(h-1)ZR$. S1 represents the first scanning capacitance microscopic signal, S3 represents the third scanning capacitance microscopic signal, and h equals the equivalent oxide thickness of the dielectric layer divided by the equivalent oxide thickness of the first silicon dioxide layer.

In an embodiment of the present invention, the impedance ratio equals the first equivalent impedance divided by the first total impedance.

In an embodiment of the present invention, each of the different areas of the dielectric layer has an equivalent oxide thickness and the corresponding third scanning capacitance microscopic signal.

In an embodiment of the present invention, the dielectric layer comprises a silicon dioxide layer or both of a silicon dioxide layer and a high-k dielectric layer.

To sum up, the method for obtaining the equivalent oxide thickness of a dielectric layer uses the two known equivalent oxide thicknesses and the impedance ratio to calculate the exact equivalent oxide thickness of the dielectric layer of a semiconductor capacitor without using a DC voltage to be affected by leakage current, and employs the scanning capacitance microscopy to measure the equivalent oxide thickness of the dielectric layer to expand the related applications of the scanning capacitance microscopy.

Below, the embodiments are described in detail in cooperation with the drawings to make easily understood the technical contents, characteristics and accomplishments of the present invention.

DETAILED DESCRIPTION OF THE INVENTION

Figure 1A:
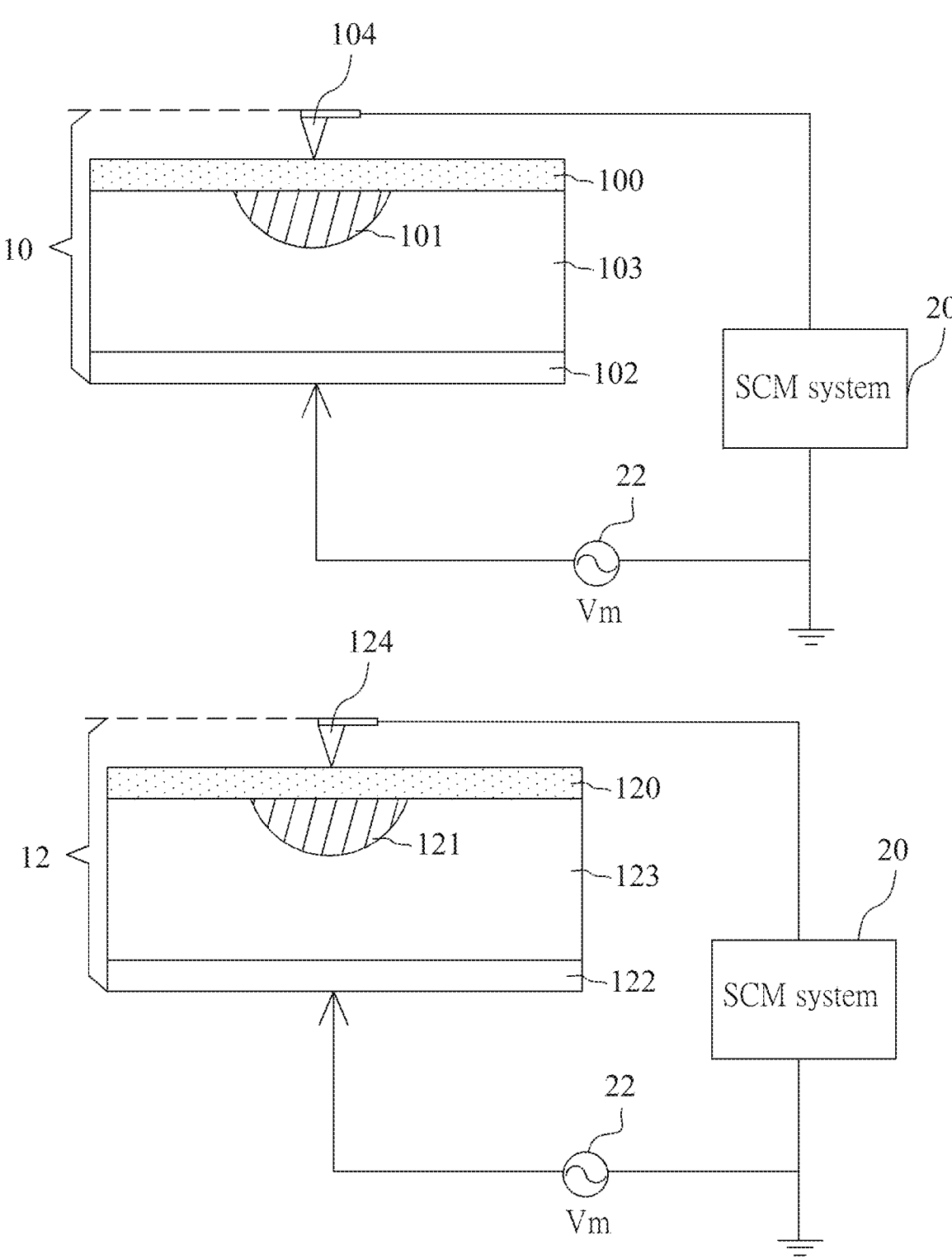
FIGS. 1(a)-1(b) are schematic diagrams illustrating the steps of a method for obtaining the equivalent oxide thickness of a dielectric layer according to an embodiment of the present invention.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatings and modifications will be apparent to those skilled in the art, once informed by the present disclosure.

When an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Furthermore, it can be understood that the terms "comprising," "including," "having," "containing," and "involving" are open-ended terms, which refer to "may include but is not limited to so." In addition, each of the embodiments or claims of the present invention is not necessary to achieve all the effects and advantages possibly to be generated, and the abstract and title of the present invention is used to assist for patent search and is not used to further limit the claimed scope of the present invention.

Further, in the present specification and claims, the term "comprising" is open type and should not be viewed as the term "consisted of." In addition, the term "electrically coupled" can be referring to either directly connecting or indirectly connecting between elements. Thus, if it is described in the below contents of the present invention that a first device is electrically coupled to a second device, the first device can be directly connected to the second device, or indirectly connected to the second device through other devices or means. Moreover, when the transmissions or generations of electrical signals are mentioned, one skilled in the art should understand some degradations or undesirable transformations could be generated during the operations. If it is not specified in the specification, an electrical signal at the transmitting end should be viewed as substantially the same signal as that at the receiving end. For example, when the end A of an electrical circuit provides an electrical signal S to the end B of the electrical circuit, the voltage of the electrical signal S may drop due to passing through the source and drain of a transistor or due to some parasitic capacitance. However, the transistor is not deliberately used to generate the effect of degrading the signal to achieve some result, that is, the signal S at the end A should be viewed as substantially the same as that at the end B.

Unless otherwise specified, some conditional sentences or words, such as "can", "could", "might", or "may", usually attempt to express what the embodiment in the invention has, but it can also be interpreted as a feature, element, or step that may not be needed. In other embodiments, these features, elements, or steps may not be required.

In the following description, a method for obtaining the equivalent oxide thickness of a dielectric layer will be described. The method for obtaining the equivalent oxide thickness of a dielectric layer uses two known equivalent oxide thicknesses and an impedance ratio to calculate the exact equivalent oxide thickness of the dielectric layer of a semiconductor capacitor without using a direct-current (DC) voltage to be affected by leakage current, and employs the scanning capacitance microscopy to measure the equivalent oxide thickness of the dielectric layer to expand the related applications of the scanning capacitance microscopy.

Figure 1B:
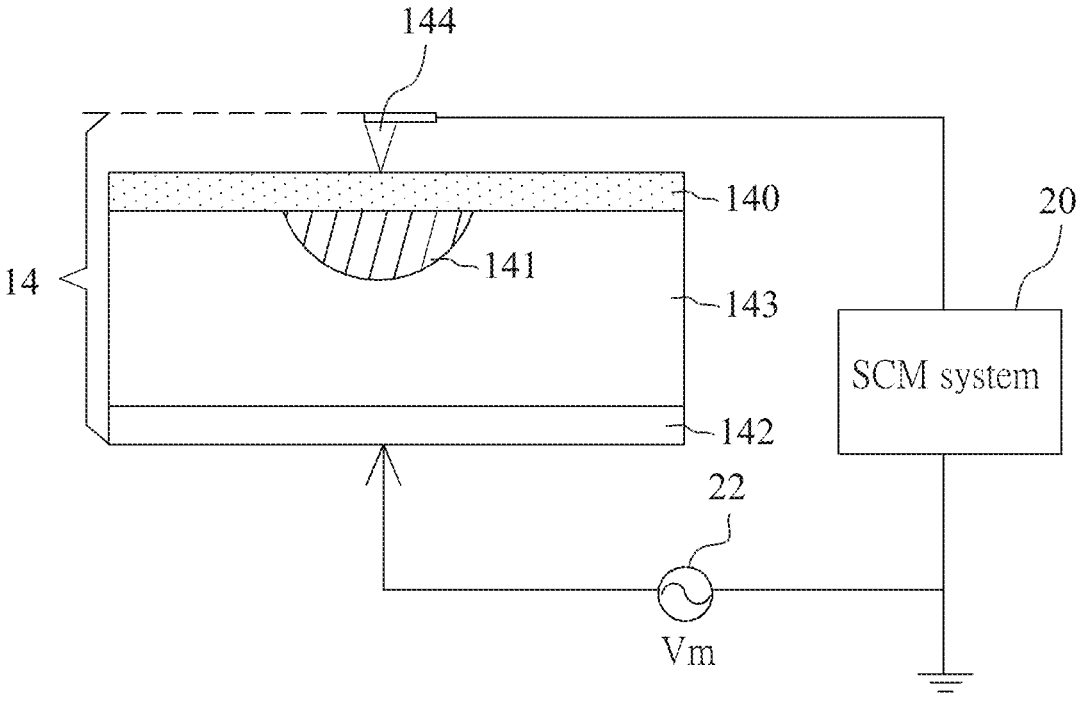

FIGS. 1(a)-1(b) are schematic diagrams illustrating the steps of a method for obtaining the equivalent oxide thickness of a dielectric layer according to an embodiment of the present invention. Referring to FIGS. 1(a)-1(b), the method for obtaining the equivalent oxide thickness of a dielectric layer of the present invention is introduced as follows. As illustrated in FIG. 1(a), a first semiconductor capacitor 10 and a second semiconductor capacitor 12 are provided. The first semiconductor capacitor 10 includes a first silicon dioxide layer 100 and a first depletion region 101. The second semiconductor capacitor 12 includes a second silicon dioxide layer 120 and a second depletion region 121. The first silicon dioxide layer 100 and the second silicon dioxide layer 120 have known equivalent oxide thicknesses. The first total impedance of the first semiconductor capacitor 10 includes the first impedances of first regions and a first equivalent impedance corresponding to the first silicon dioxide layer 100. The second total impedance of the second semiconductor capacitor 12 includes the second impedances of second regions and a second equivalent impedance corresponding to the second silicon dioxide layer 120. The first impedances are respectively equal to the second impedances.

In some embodiments, each of the first semiconductor capacitor 10 and the second semiconductor capacitor 12 is a metal-oxide-semiconductor capacitor. The first semiconductor capacitor 10 includes, but is not limited to, the first silicon dioxide layer 100, the first depletion region 101, a first electrode layer 102, a first semiconductor substrate 103, and a conductive probe 104. The first electrode layer 102 and the first silicon dioxide layer 100 are respectively formed on the bottom surface and the top surface of the first semiconductor substrate 103. The first depletion region 101 is formed in the first semiconductor substrate 103. The conductive probe 104, electrically connected to a scanning capacitance microscope (SCM) system 20 and grounded, touches the first silicon dioxide layer 100. The SCM system 20 includes an ultra-high frequency capacitance sensor and a lock-in amplifier. The first electrode layer 102 is electrically connected to a modulation voltage source 22. The modulation voltage source 22 generates a modulation voltage Vm, wherein the modulation voltage Vm is an alternating-current (AC) voltage. The first impedances may include the impedance $Zp1$ of the conductive probe 104, the impedance $Zd1$ of the first depletion region 101, the impedance $Ze1$ of the first electrode layer 102, and the impedance $Zs1$ of the first semiconductor substrate 103. The first equivalent impedance $Zeq1$ may include the impedance $Zit1$ of an interface between the first silicon dioxide layer 100 and the first semiconductor substrate 103 and the impedance $Zo1$ of the first silicon dioxide layer 100. In order to reduce the impedance $Zit1$ of the interface between the first silicon dioxide layer 100 and the first semiconductor substrate 103, the first semiconductor substrate 103 can be implemented with a silicon substrate, but the present invention is not limited thereto.

The second semiconductor capacitor 12 includes, but is not limited to, the second silicon dioxide layer 120, the second depletion region 121, a second electrode layer 122, a second semiconductor substrate 123, and a conductive probe 124. The second electrode layer 122 and the second silicon dioxide layer 120 are respectively formed on the bottom surface and the top surface of the second semiconductor substrate 123. The second depletion region 121 is formed in the second semiconductor substrate 123. The conductive probe 124, electrically connected to the SCM system 20 and grounded, touches the second silicon dioxide layer 120. The second electrode layer 122 is electrically connected to the modulation voltage source 22. The second impedances may include the impedance Zp2 of the conductive probe 124, the impedance Zd2 of the second depletion region 121, the impedance Ze2 of the second electrode layer 122, and the impedance Zs2 of the second semiconductor substrate 123. The second equivalent impedance Zeq2 may include the impedance Zit2 of an interface between the second silicon dioxide layer 120 and the second semiconductor substrate 123 and the impedance Zo2 of the second silicon dioxide layer 120. Zp2, Zd2, Ze2, and Zs2 are respectively equal to Zp1, Zd1, Ze1, and Zs1. In order to reduce the impedance Zit2 of the interface between the second silicon dioxide layer 120 and the second semiconductor substrate 123, the second semiconductor substrate 123 can be implemented with a silicon substrate, but the present invention is not limited thereto.

Then, by the scanning capacitance microscopy and the modulation voltage source 22, a modulation voltage Vm is applied to the first semiconductor capacitor 10 and the second semiconductor capacitor 12 to periodically vary the widths of the first depletion region 101 and the second depletion region 121. In addition, the SCM system 20 measures a first scanning capacitance microscopic signal and a second scanning capacitance microscopic signal respectively corresponding to the first semiconductor capacitor 10 and the second semiconductor capacitor 12. The scanning capacitance microscopic signal has a unit of volt. The variation of the capacitance of the depletion region divided by the variation of the modulation voltage Vm is directly proportional to the corresponding scanning capacitance microscopic signal. S1 and S2 respectively represent the first scanning capacitance microscopic signal and the second scanning capacitance microscopic signal. Since Zp1, Ze1, Zs1, Zeq1, Zp2, Ze2, Zs2, and Zeq2 are constant and Zd1 or Zd2 varies with the modulation voltage Vm, $$S1 = \alpha\left(\frac{Zd1}{Zp1 + Ze1 + Zs1 + Zeq1 + Zd1}\right) \times Vm \text{ and}$$

$$S2 = \alpha\left(\frac{Zd2}{Zp2 + Ze2 + Zs2 + Zeq2 + Zd2}\right) \times Vm.$$

α represents the system parameter. Then, an impedance ratio ZR is calculated according to the equivalent oxide thicknesses of the first silicon dioxide layer 100 and the second silicon dioxide layer 120, the first scanning capacitance microscopic signal S1, and the second scanning capacitance microscopic signal S2.

$$Zeq1 = \frac{1}{j\omega Ceq1},$$

where Ceq1 represents the capacitance corresponding to Zeq1 and ω represents an angular frequency.

$$Ceq1 = \frac{EOT2}{EOT1}Ceq2 = kCeq2,$$

where EOT1 represents the equivalent oxide thickness of the first silicon dioxide layer 100 and EOT2 represents the equivalent oxide thickness of the second silicon dioxide layer 120.

$$Zeq2 = \frac{1}{j\omega Ceq2} = \frac{1}{j\omega\frac{1}{k}Ceq1} = kZeq1.$$

As a result, S1/S2=1+(k−1)ZR, where k equals the equivalent oxide thickness of the second silicon dioxide layer 120 divided by the equivalent oxide thickness of the first silicon dioxide layer 100. Specifically, the impedance ration ZR equals the first equivalent impedance Zeq1 divided by the first total impedance.

After calculating the impedance ratio, as illustrated in FIG. 1(*b*), a third semiconductor capacitor 14 is provided. The third semiconductor capacitor 14 includes a dielectric layer 140 and a third depletion region 141. The third total impedance of the third semiconductor capacitor 14 includes the third impedances of third regions and a third equivalent impedance corresponding to the dielectric layer 140 of the third semiconductor capacitor 14. The third impedances are respectively equal to the first impedances. In some embodiments, the third semiconductor capacitor 14 may be a metal-oxide-semiconductor capacitor. The third semiconductor capacitor 14 includes, but is not limited to, the dielectric layer 140, the third depletion region 141, a third electrode layer 142, a third semiconductor substrate 143, and a conductive probe 144. The third electrode layer 142 and the dielectric layer 140 are respectively formed on the bottom surface and the top surface of the third semiconductor substrate 143. The third depletion region 141 is formed in the third semiconductor substrate 143. The conductive probe 144, electrically connected to the SCM system 20 and grounded, touches the dielectric layer 140. The third electrode layer 142 is electrically connected to the modulation voltage source 22. The third impedances may include the impedance Zp3 of the conductive probe 144, the impedance Zd3 of the third depletion region 141, the impedance Ze3 of the third electrode layer 142, and the impedance Zs3 of the third semiconductor substrate 143. The third equivalent impedance Zeq3 may include the impedance Zit3 of an interface between the dielectric layer 140 and the third semiconductor substrate 143 and the impedance Zo3 of the dielectric layer 140. Zp3, Zd3, Ze3, and Zs3 are respectively equal to Zp1, Zd1, Ze1, and Zs1. In order to reduce the impedance Zit3 of the interface between the dielectric layer 140 and the third semiconductor substrate 143, the third semiconductor substrate 143 can be implemented with a silicon substrate, but the present invention is not limited thereto.

Then, by the scanning capacitance microscopy, the modulation voltage Vm is applied to the third semiconductor capacitor 14 to periodically vary the width of the third depletion region 141 and a third scanning capacitance microscopic signal S3 corresponding to the third semiconductor capacitor 14 is measured. Finally, the equivalent oxide thickness of the dielectric layer 140 of the third semiconductor capacitor 14 is obtained according to the equivalent oxide thickness of the first silicon dioxide layer 100, the first scanning capacitance microscopic signal S1, the third scanning capacitance microscopic signal S3, and the impedance ratio ZR. Since S1/S2=1+(k−1)ZR, S1/S3=1+(h−1)ZR. h equals the equivalent oxide thickness of the dielectric layer 140 divided by the equivalent oxide thickness of the first silicon dioxide layer 100.

In some embodiments of the present invention, the dielectric layer 140 includes a silicon dioxide layer or both of a silicon dioxide layer and a high-k dielectric layer. For example, the high-k dielectric layer can include hafnium dioxide. When the dielectric layer 140 includes a silicon dioxide layer and a high-k dielectric layer, the silicon dioxide layer is formed between the high-k dielectric layer and the third semiconductor substrate 143. The equivalent oxide thicknesses of the first silicon dioxide layer 100 and the second silicon dioxide layer 120 are obtained by measuring the capacitance versus voltage characteristic curves of the first semiconductor capacitor 10 and the second semiconductor capacitor 12 at a control frequency. Since there are many defects at an interface between the high-k dielectric layer and the silicon dioxide layer, the dielectric layer 140 has high impedance. When the low-frequency modulation voltage Vm is applied to the third semiconductor capacitor 14, a leakage current is generated and the inaccurate equivalent oxide thickness of the dielectric layer 140 is obtained. In order to avoid this problem and the frequency dispersion of the capacitance versus voltage measurement curves, the control frequency can be equal to the alternating-current (AC) frequency of the modulation voltage Vm.

Figure 2:
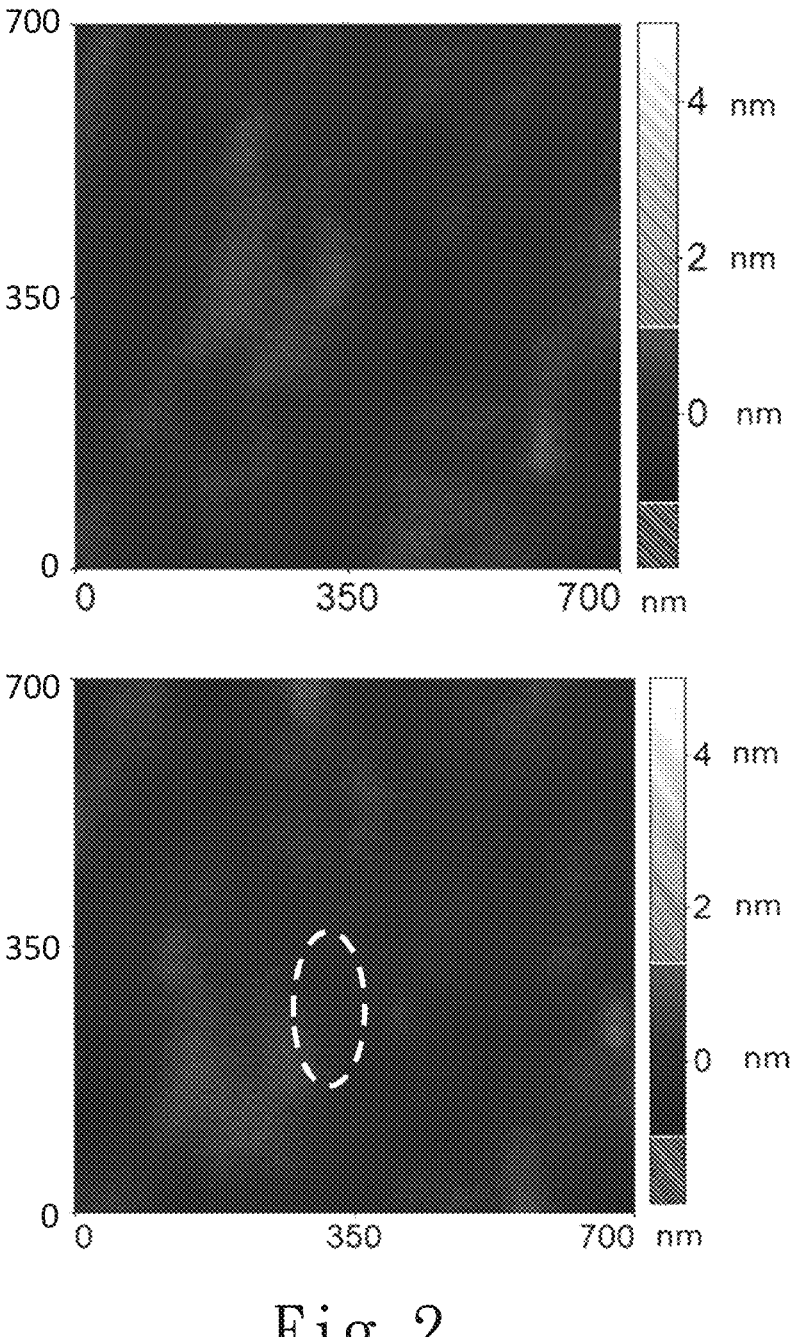
FIG. 2 is a diagram illustrating atomic force microscope (AFM) images of a third semiconductor capacitor before and after applying a DC voltage according to an embodiment of the present invention.
Figure 3:
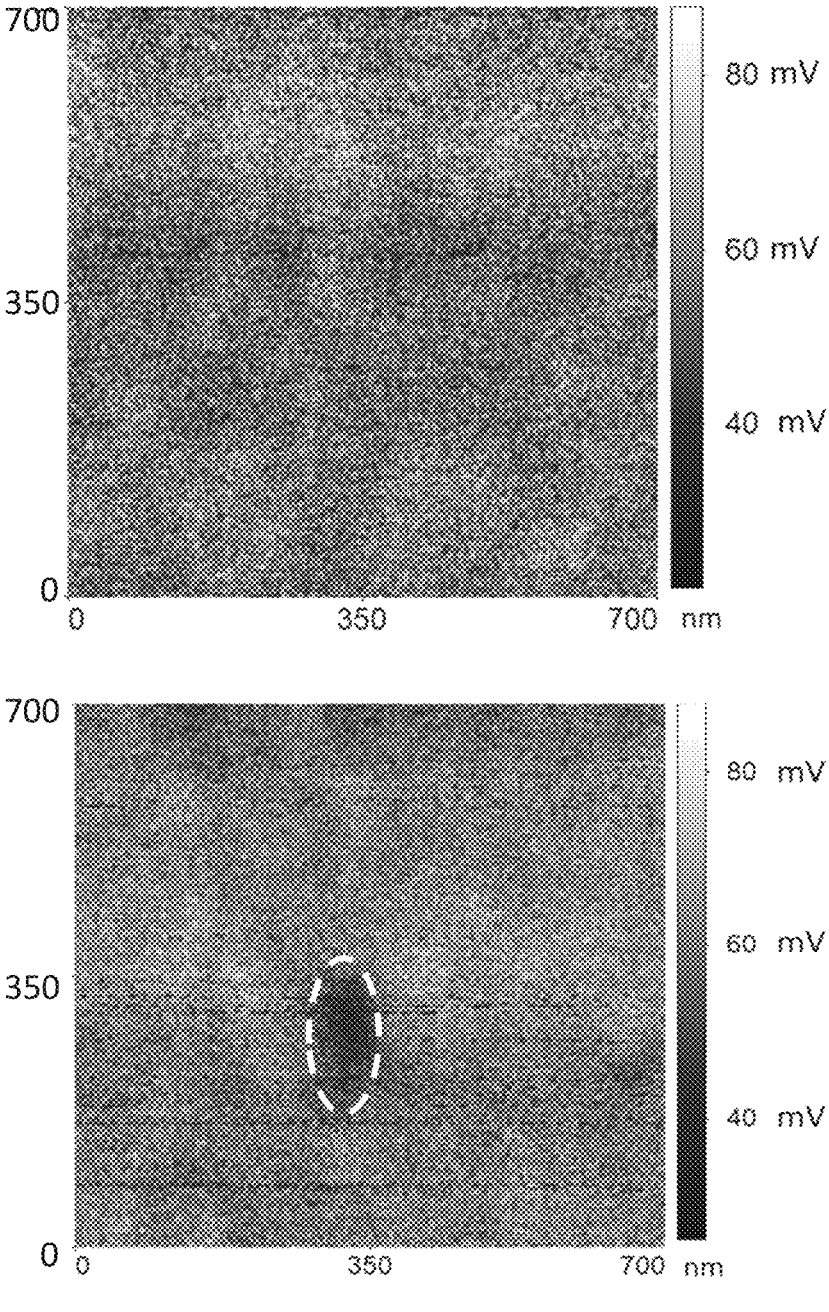
FIG. 3 is a diagram illustrating scanning capacitance microscope (SCM) images of a third semiconductor capacitor before and after applying a DC voltage according to an embodiment of the present invention.
Figure 4:
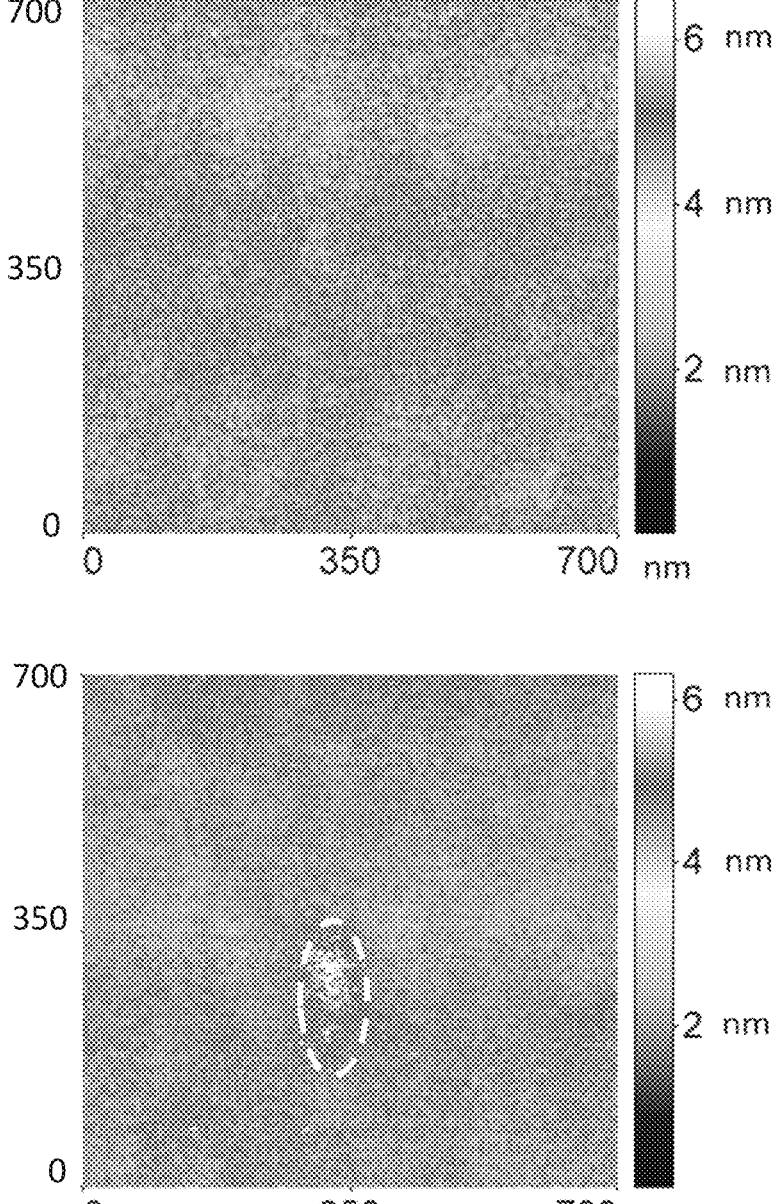
FIG. 4 is a diagram illustrating equivalent oxide thickness (EOT) images of a third semiconductor capacitor before and after applying a DC voltage according to an embodiment of the present invention.

FIG. 2 is a diagram illustrating atomic force microscope (AFM) images of a third semiconductor capacitor before and after applying a DC voltage according to an embodiment of the present invention. The unit of each of the horizontal axis and the vertical axis of FIG. 2 is nm. FIG. 3 is a diagram illustrating scanning capacitance microscope (SCM) images of a third semiconductor capacitor before and after applying a DC voltage according to an embodiment of the present invention. The unit of each of the horizontal axis and the vertical axis of FIG. 3 is mV. FIG. 4 is a diagram illustrating equivalent oxide thickness (EOT) images of a third semiconductor capacitor before and after applying a DC voltage according to an embodiment of the present invention. The unit of each of the horizontal axis and the vertical axis of FIG. 4 is nm. Please refer to FIG. 1(*b*), FIG. 2, FIG. 3, and FIG. 4. As illustrated in FIG. 2, FIG. 3, and FIG. 4, the upper image is an image before applying a DC voltage, the lower image is an image after applying the DC voltage, and a dashed circle has a location where the DC voltage is applied. From FIG. 1(*b*), FIG. 2, FIG. 3, and FIG. 4, each of the different areas of the dielectric layer 140 has an equivalent oxide thickness and the corresponding third scanning capacitance microscopic signal.

According to the embodiments provided above, the method for obtaining the equivalent oxide thickness of the dielectric layer uses the two known equivalent oxide thicknesses and the impedance ratio to calculate the exact equivalent oxide thickness of the dielectric layer of a semiconductor capacitor without using a DC voltage to be affected by leakage current, and employs the scanning capacitance microscopy to measure the equivalent oxide thickness of the dielectric layer to expand the related applications of the scanning capacitance microscopy.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A method for obtaining the equivalent oxide thickness of a dielectric layer comprising:

providing a first semiconductor capacitor and a second semiconductor capacitor, wherein the first semiconductor capacitor comprises a first silicon dioxide layer and a first depletion region, the second semiconductor capacitor comprises a second silicon dioxide layer and a second depletion region, the first silicon dioxide layer and the second silicon dioxide layer have known equivalent oxide thicknesses, a first total impedance of the first semiconductor capacitor comprises first impedances of first regions and a first equivalent impedance corresponding to the first silicon dioxide layer, a second total impedance of the second semiconductor capacitor comprises second impedances of second regions and a second equivalent impedance corresponding to the second silicon dioxide layer, and the first impedances are respectively equal to the second impedances;

by scanning capacitance microscopy, applying a modulation voltage to the first semiconductor capacitor and the second semiconductor capacitor to periodically vary widths of the first depletion region and the second depletion region and measuring a first scanning capacitance microscopic signal and a second scanning capacitance microscopic signal respectively corresponding to the first semiconductor capacitor and the second semiconductor capacitor;

calculating an impedance ratio according to the equivalent oxide thicknesses of the first silicon dioxide layer and the second silicon dioxide layer, the first scanning capacitance microscopic signal, and the second scanning capacitance microscopic signal;

providing a third semiconductor capacitor, wherein the third semiconductor capacitor comprises a dielectric layer and a third depletion region, a third total impedance of the third semiconductor capacitor comprises third impedances of third regions and a third equivalent impedance corresponding to the dielectric layer of the third semiconductor capacitor, and the third impedances are respectively equal to the first impedances;

by the scanning capacitance microscopy, applying the modulation voltage to the third semiconductor capacitor to periodically vary a width of the third depletion region and measuring a third scanning capacitance microscopic signal corresponding to the third semiconductor capacitor; and obtaining an equivalent oxide thickness of the dielectric layer of the third semiconductor capacitor according to the equivalent oxide thickness of the first silicon dioxide layer, the first scanning capacitance microscopic signal, the third scanning capacitance microscopic signal, and the impedance ratio.

2. The method for obtaining the equivalent oxide thickness of a dielectric layer according to claim 1, wherein each of the first semiconductor capacitor, the second semiconductor capacitor, and the third semiconductor capacitor is a metal-oxide-semiconductor capacitor.

3. The method for obtaining the equivalent oxide thickness of a dielectric layer according to claim 1, wherein each of the first semiconductor capacitor, the second semiconductor capacitor, and the third semiconductor capacitor further comprises a conductive probe that is electrically grounded.

4. The method for obtaining the equivalent oxide thickness of a dielectric layer according to claim 1, wherein the equivalent oxide thicknesses of the first silicon dioxide layer and the second silicon dioxide layer are obtained by measuring capacitance versus voltage characteristic curves of the first semiconductor capacitor and the second semiconductor capacitor at a control frequency equal to an alternating-current (AC) frequency of the modulation voltage.

5. The method for obtaining the equivalent oxide thickness of a dielectric layer according to claim 1, wherein the first semiconductor capacitor further comprises a first electrode layer and a first semiconductor substrate, the first electrode layer and the first silicon dioxide layer are respectively formed on a bottom surface and a top surface of the first semiconductor substrate, the second semiconductor capacitor further comprises a second electrode layer and a second semiconductor substrate, the second electrode layer and the second silicon dioxide layer are respectively formed on a bottom surface and a top surface of the second semiconductor substrate, the third semiconductor capacitor further comprises a third electrode layer and a third semiconductor substrate, the third electrode layer and the dielectric layer are respectively formed on a bottom surface and a top surface of the third semiconductor substrate, the first impedances comprise an impedance of the first depletion region, an impedance of the first electrode layer, and an impedance of the first semiconductor substrate, the first equivalent impedance comprises an impedance of an interface between the first silicon dioxide layer and the first semiconductor substrate and an impedance of the first silicon dioxide layer, the second impedances comprise an impedance of the second depletion region, an impedance of the second electrode layer, and an impedance of the second semiconductor substrate, the second equivalent impedance comprises an impedance of an interface between the second silicon dioxide layer and the second semiconductor substrate and an impedance of the second silicon dioxide layer, the third impedances comprise an impedance of the third depletion region, an impedance of the third electrode layer, and an impedance of the third semiconductor substrate, and the third equivalent impedance comprises an impedance of an interface between the dielectric layer and the third semiconductor substrate and an impedance of the dielectric layer.

6. The method for obtaining the equivalent oxide thickness of a dielectric layer according to claim 1, wherein the equivalent oxide thicknesses of the first silicon dioxide layer and the second silicon dioxide layer, the first scanning capacitance microscopic signal, the second scanning capacitance microscopic signal, and the impedance ratio satisfy an equation of S1/S2=1+(k−1) ZR, S1 represents the first scanning capacitance microscopic signal, S2 represents the second scanning capacitance microscopic signal, k equals the equivalent oxide thickness of the second silicon dioxide layer divided by the equivalent oxide thickness of the first silicon dioxide layer, and ZR represents the impedance ratio.

7. The method for obtaining the equivalent oxide thickness of a dielectric layer according to claim 6, wherein the first scanning capacitance microscopic signal, the third scanning capacitance microscopic signal, the equivalent oxide thickness of the first silicon dioxide layer, and the impedance ratio satisfy an equation of S1/S3=1+(h−1)ZR, S1 represents the first scanning capacitance microscopic signal, S3 represents the third scanning capacitance microscopic signal, and h equals the equivalent oxide thickness of the dielectric layer divided by the equivalent oxide thickness of the first silicon dioxide layer.

8. The method for obtaining the equivalent oxide thickness of a dielectric layer according to claim 6, wherein the impedance ratio equals the first equivalent impedance divided by the first total impedance.

9. The method for obtaining the equivalent oxide thickness of a dielectric layer according to claim 1, wherein the dielectric layer comprises a silicon dioxide layer or both of a silicon dioxide layer and a high-k dielectric layer.

* * * * *